United States Patent
White

(10) Patent No.: US 11,465,759 B2
(45) Date of Patent: Oct. 11, 2022

(54) MULTI-MODE GENERATOR FOR ICE PROTECTION ON AIRCRAFT

(71) Applicant: The Boeing Company, Chicago, IL (US)

(72) Inventor: Jeffrey J. White, Shoreline, WA (US)

(73) Assignee: THE BOEING COMPANY, Chicago, IL (US)

( * ) Notice: Subject to any disclaimer, the term of this patent is extended or adjusted under 35 U.S.C. 154(b) by 972 days.

(21) Appl. No.: 16/034,476

(22) Filed: Jul. 13, 2018

(65) Prior Publication Data
US 2020/0017221 A1  Jan. 16, 2020

(51) Int. Cl.
| | |
|---|---|
| *B64D 15/12* | (2006.01) |
| *B64D 15/20* | (2006.01) |
| *B64D 41/00* | (2006.01) |
| *H02J 3/00* | (2006.01) |
| *H02K 7/18* | (2006.01) |
| *H05B 3/22* | (2006.01) |

(52) U.S. Cl.
CPC ............. *B64D 15/12* (2013.01); *B64D 15/20* (2013.01); *B64D 41/00* (2013.01); *H02J 3/00* (2013.01); *H02K 7/1807* (2013.01); *H05B 3/22* (2013.01); *B64D 2221/00* (2013.01); *H02J 3/001* (2020.01)

(58) Field of Classification Search
CPC ........ B64D 15/12; B64D 15/20; B64D 15/22; B64D 2221/00; H02P 8/165; H02P 9/00; H02P 9/305
See application file for complete search history.

(56) References Cited

U.S. PATENT DOCUMENTS

| | | | | |
|---|---|---|---|---|
| 5,344,696 A | * | 9/1994 | Hastings | ................... B32B 7/02 428/220 |
| 7,112,944 B1 | * | 9/2006 | Kojori | ................. H02M 5/4505 290/31 |
| 8,777,163 B2 | | 7/2014 | Safai et al. | |
| 9,469,408 B1 | | 10/2016 | Elangovan et al. | |
| 9,612,163 B2 | | 4/2017 | Meis et al. | |

(Continued)

FOREIGN PATENT DOCUMENTS

| | | |
|---|---|---|
| EP | 2460730 A2 | 6/2012 |
| EP | 2881329 A1 | 6/2016 |

*Primary Examiner* — Timothy D Collins
*Assistant Examiner* — Justin Michael Heston
(74) *Attorney, Agent, or Firm* — Coats & Bennett, PLLC

(57) ABSTRACT

On an aircraft, a multi-mode power generator is operated in a variable voltage mode to power an electric Wng Ice Prevention System (eWIPS), and is operated in a fixed voltage mode to provide backup power. When atmospheric conditions are conducive to the formation of ice (and main generators are operative), the multi-mode power generator is operated in variable voltage mode to power the eWIPS with a first or second variable voltage. The first variable voltage, the value of which depends on atmospheric conditions, is for anti-ice operation. The second variable voltage, which can be the maximum output voltage, is for de-ice operation. Transitions between different variable voltage levels are not instantaneous which eliminates fatigue damage due to transients. If a main generator fails (or when atmospheric conditions are not conducive to the formation of ice), the multi-mode power generator is operated in fixed voltage mode to provide backup power.

20 Claims, 10 Drawing Sheets

(56) References Cited

U.S. PATENT DOCUMENTS

| | | |
|---|---|---|
| 9,764,847 B2 | 9/2017 | Wright |
| 2007/0112480 A1 | 5/2007 | Smith et al. |
| 2010/0193630 A1* | 8/2010 | Duces ................ H02J 3/02 |
| | | 244/58 |
| 2012/0232728 A1 | 9/2012 | Karimi et al. |
| 2013/0033246 A1* | 2/2013 | Krenz ................ H02M 5/293 |
| | | 323/282 |
| 2013/0049366 A1* | 2/2013 | Seger ................ F01D 15/10 |
| | | 290/46 |
| 2014/0319278 A1* | 10/2014 | Ribarov ................ B64D 15/14 |
| | | 244/134 D |

\* cited by examiner

MULTI-MODE GENERATOR FOR ICE PROTECTION ON AIRCRAFT

TECHNICAL FIELD

The present disclosure relates generally to aircraft ice prevention/removal, and in particular to a multi-mode generator operative to provide variable power to an electric Wing Ice Protection System or fixed power to a main bus as backup power if a main generator fails.

BACKGROUND

Aircraft are a critical element of modern transportation. An aircraft includes flying surfaces (e.g. flight surfaces), such as the leading edges of wings, horizontal stabilizers, canards, and the like. One or more engines, which may be mounted in the nose, under the wings, attached to the fuselage, or in the tail of an aircraft, provide thrust. The engines also drive integral generators, which generate electricity at a fixed voltage level to power various electrical loads on the aircraft.

The formation of ice on flying surfaces of an aircraft—primarily the wings but also horizontal stabilizers, canards, propellers, and other flying surfaces—is a known issue. Ice destroys the smooth flow of air over the flying surfaces, increasing drag while decreasing the ability of an airfoil to generate lift. Icing can increase an aircraft's stall speed, and/or lower the angle of attack at which it will stall. Severe icing can make the aircraft un-flyable.

Aircraft ice mitigations systems are known in the art. Anti-icing refers to a system used to prevent the formation of ice on flying surfaces, when atmospheric conditions are conducive to icing. Anti-ice systems include applying heat, either electrical or from engine bleed air, and "weeping wing" systems that dispense antifreeze type fluids through a mesh screen embedded in, e.g., a wing leading edge. De-icing refers to the removal of ice that has already formed on flying surfaces. De-icing systems include inflatable boots that expand under pneumatic pressure, and heating systems operated at a higher intensity than in anti-icing use.

Commercial passenger jet aircraft typically employ a "hot wing" pneumatic or electrical heating system for ice mitigation, known in the art as a Wng Ice Prevention System (WIPS), although it can also be utilized on surfaces other than wings. Pneumatic systems are associated with engine performance penalties, so electric WIPS (eWIPS) systems have been developed. However, known eWIPS systems are complex, heavy, and costly. For example, the electro-thermal eWIPS on recent more electric aircraft utilize a large controller, extensive wiring, and require level A (critical) software. With this approach, fixed-voltage power is generated by generators on the engines, and transmitted by heavy gauge feeders to a controller in an electrical equipment bay in the nose, where the electrical power is switched and re-routed to heating zones on the wings.

As depicted in FIG. 1, the controller applies power at full output voltage (100%) to all of a plurality of protected zones on the wings for de-icing. For anti-icing, the controller pulses full output voltage (100%) for a limited duration successively to each zone, or thermally protected area of the wings. This applied power must be transferred from the controller in the electronic equipment bay back to the wings—again, via heavy wiring—where it is applied to resistive surfaces affixed to segments of the wings. In addition to the weight and complexity of conventional voltage generation and distribution for eWIPS, the sudden, full-power pulsing, as depicted in FIG. 1, imparts significant torque pulses into the engine gearbox, which can cause excessive wear and premature failure (or alternatively, the expensive upsizing of gearbox components to accommodate these torque pulses).

The U.N. International Civil Aviation Organization (ICAN) and U.S. Federal Aviation Administration (FAA) define Extended Operations (ETOPS) for certain multi-engine passenger aircraft. ETOPS constrains flight planning by imposing maximum distances aircraft can fly from a suitable airport, in terms of maximum rated time of flight with one engine operative. Among the requirements for ETOPS is the presence of a backup generator for use in the event of failure of a main generator. On almost all flights, this backup generator is "dead weight" that is never used.

The Background section of this document is provided to place aspects of the present disclosure in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of aspects of the disclosure or to delineate the scope of the disclosure. The sole purpose of this summary is to present some concepts disclosed herein in a simplified form as a prelude to the more detailed description that is presented later.

According to one or more aspects of the present disclosure described and claimed herein, one or more multi-mode generators are operated in a variable voltage mode to power an eWIPS, and are operated in a fixed voltage mode to provide backup power. In particular, when atmospheric conditions are conducive to the formation of ice (and main generators are operative), at least one multi-mode power generator is operated in variable voltage mode to power the eWIPS with a first or second variable voltage. The first variable voltage, the value of which depends on atmospheric conditions, is for anti-ice operation. The second variable voltage, which can be the maximum output voltage, is for de-ice operation. Transitions between different variable voltage levels are not instantaneous. Upon the failure of a main generator (or when atmospheric conditions are not conducive to the formation of ice), the multi-mode power generator is operated in fixed voltage mode to provide backup power, e.g., at either 115V or 230V.

One aspect relates to a method of operating a first multi-mode generator to power an electric Wing Ice Protection System (eWIPS) applying heat to flying surfaces of an aircraft. Atmospheric conditions are monitored. During atmospheric conditions conducive to the formation of ice, and when sufficient main generators are operative and providing power to a main aircraft electrical bus, the first multi-mode generator is operated in a variable voltage mode and a variable voltage is provided to the eWIPS. During atmospheric conditions not conducive to the formation of ice, or upon a failure of one or more main generators, the first multi-mode generator is operated in a fixed voltage mode and a predetermined fixed voltage is provided to the main aircraft electrical bus as backup power.

Another aspect relates to an aircraft. The aircraft includes two wings, a main aircraft electrical bus, one or more main aircraft bus generators providing fixed voltage to the main aircraft electrical bus, and an electric Wing Ice Protection System (eWIPS) configured to apply heat to flying surfaces of the aircraft. The aircraft also includes atmospheric condition sensors and processing circuitry receiving the output of the atmospheric condition sensors. The processing circuitry is operative to control the eWIPS. A first multi-mode generator is configured to, when the processing circuitry determines atmospheric conditions are conducive to the formation of ice and when sufficient main aircraft bus generators are operative, operate in a variable voltage mode and provide a variable voltage to the eWIPS. The first multi-mode generator is further operative to, when the processing circuitry determines atmospheric conditions are not conducive to the formation of ice, or upon a failure of one or more main aircraft bus generators, operate in a fixed voltage mode and provide a predetermined fixed voltage to the main aircraft electrical bus as backup power.

BRIEF DESCRIPTION OF THE DRAWINGS

The present disclosure will now be described more fully hereinafter with reference to the accompanying drawings, in which aspects of the disclosure are shown. However, this disclosure should not be construed as limited to the aspects set forth herein. Rather, these aspects are provided so that this disclosure will be thorough and complete, and will fully convey the scope of the disclosure to those skilled in the art. Like numbers refer to like elements throughout.

DETAILED DESCRIPTION

For simplicity and illustrative purposes, the present disclosure is described by referring mainly to an exemplary aspect thereof. In the following description, numerous specific details are set forth in order to provide a thorough understanding of the present disclosure. However, it will be readily apparent to one of ordinary skill in the art that the aspects of the present disclosure can be practiced without limitation to these specific details. In this description, well known methods and structures have not been described in detail so as not to unnecessarily obscure the present disclosure.

Figure 2:
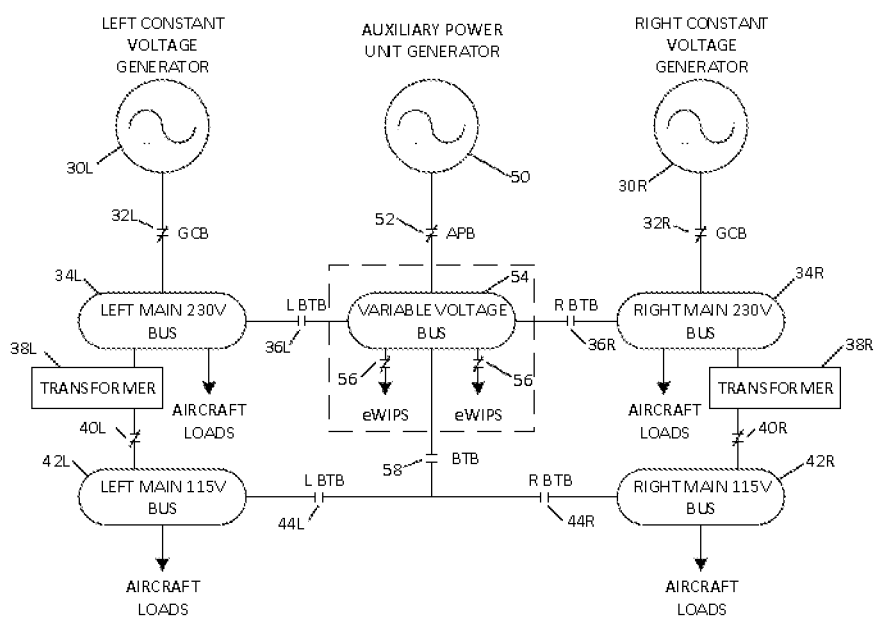
FIG. 2 is a block diagram of an auxiliary generator providing variable voltage for eWIPS.

FIG. 2 depicts an aircraft electrical generation and distribution configuration, according to one aspect of the present disclosure. In this aspect, a multi-mode generator—the auxiliary power unit generator 50—powers (e.g. applies power to) an eWIPS applying heat to flying surfaces of the aircraft. The auxiliary power unit generator 50 is conventionally used for providing ground power or as a backup to a main bus in the event of a failure of one or more main generators 30L, 30R. FIG. 2 depicts normal operation in atmospheric conditions conducive to the formation of ice. The components depicted outside of the dashed box in FIG. 2 are conventional.

The left constant voltage generator 30L, driven by an engine on the left wing, provides constant-voltage power at $230V_{RMS}$, through a generator circuit breaker (GCB) 32L, to the left main aircraft 230V electrical bus 34L, which powers various 230V aircraft loads. Although depicted as a single line for clarity, those of skill in the art will recognize that the left constant voltage generator 30L produces, and the left main aircraft 230V electrical bus 34L distributes, three-phase AC power. The left main aircraft 230V electrical bus 34L is isolated from other electrical buses by the left bus tie breaker (L BTB) 36L.

A transformer 38L steps down the 230V power from the left main aircraft 230V electrical bus 34L to $115V_{RMS}$, and provides it, through circuit breaker 40L, to the left main aircraft 115V electrical bus 42L. The left main aircraft 115V electrical bus 42L powers various aircraft 115V loads, and is isolated from other electrical buses by left bus tie breaker (L BTB) 44L.

Similarly, the right constant voltage generator 30R, driven by an engine on the right wing, provides constant-voltage power at $230V_{RMS}$ through a generator circuit breaker (GCB) 32R, which is distributed to aircraft loads by the right main aircraft 230V bus 34R and right main aircraft 115V bus 42R, as described above for the left side.

The auxiliary power unit generator 50, which can be driven by a turbine in the tail of the aircraft, is normally isolated by auxiliary power breaker (APB) 52, and is used on the ground when the engines are off or in the event of a failure of one or both of the left and right constant voltage generators 30L, 30R in flight. According to one aspect of the present disclosure, the auxiliary power unit generator 50 is a multi-mode generator 50. The multi-mode generator 50 can be operated in a variable voltage mode to provide a variable voltage to the eWIPS in atmospheric conditions conducive to the formation of ice and when the main generators 30L, 30R are operative. Alternatively, upon a failure of one or more main generators 30L, 30R (or other equipment or component), the multi-mode generator 50 can be operated in a fixed voltage mode (e.g. constant voltage mode) in which it provides a predetermined fixed voltage, e.g., either 230V or 115V, to a main aircraft electrical bus 34L, 34R or 42L, 42R, respectively, as backup power.

During normal operation, that is, in atmospheric conditions conducive to the formation of ice and when both the left and right constant voltage generators 30L, 30R are operative, the auxiliary power unit generator 50 provides variable-voltage power, via the auxiliary power breaker 52, to a variable voltage bus 54. The variable voltage bus 54 provides variable voltage to the eWIPS, via circuit breakers 56. The variable voltage bus 54 is isolated from the main aircraft 230V buses by left and right bus tie breakers 36L, 36R, and from the main aircraft 115V buses by bus tie breakers 58, 44L, and (R BTB) 44R.

Figure 3:
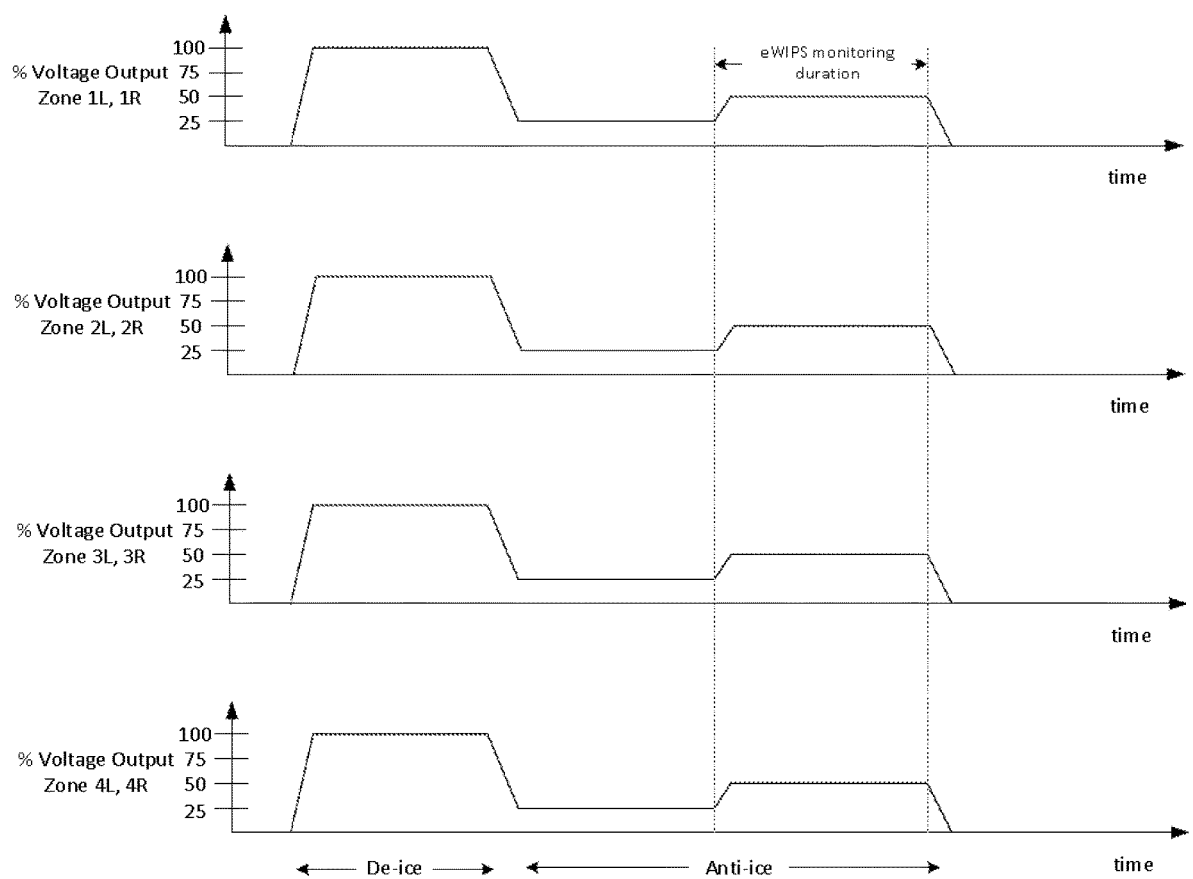
FIG. 3 is a signal diagram of a variable voltage generation for eWIPS in both de-icing and anti-icing operation.

FIG. 3 depicts the operation of a multi-mode generator (which, in the case of the configuration of FIG. 2, is the auxiliary power unit generator 50) when providing variable voltage to the eWIPS. When sensors detect the presence of ice on flying surfaces, processing circuitry operates the multi-mode generator in de-ice mode, providing a second variable voltage—in the case depicted, full output voltage (100%)—to all four zones of resistive heating elements on both wings. The duration of de-ice mode operation is determined by the icing sensors.

When sensors detect that no more ice is on the flying surfaces, but atmospheric conditions remain conducive to the formation of ice, processing circuitry operates the multi-mode generator in anti-ice mode. A first variable voltage, which is appropriate to the current atmospheric conditions, is determined and the multi-mode generator provides the first variable voltage, such as 25% of full power. Processing circuitry monitors the atmospheric conditions for a predetermined time, or at predetermined intervals, referred to herein as a eWIPS monitoring duration. At the expiration of each eWIPS monitoring duration, the processing circuitry can maintain the first variable voltage (e.g. voltage level or voltage output) of the multi-mode generator, or can adjust it. For example, FIG. 3 depicts an increase in the first variable voltage provided to all four zones, from 25% to 50% of maximum output voltage. This can correspond, for example, to a detected decrease in external air temperature, an increase in humidity, or some other combination of atmospheric conditions that increase the likelihood of ice formation. Those of skill in the art will note that as the eWIPS monitoring duration decreases, the system approaches continuous, real-time monitoring and adjustment.

In general, either the first or second variable voltage level may be periodically or continuously adjusted, in response to aircraft status (e.g., speed, altitude, etc.), icing detection, and atmospheric conditions, to provide an optimal level of de-ice or anti-ice power to the eWIPS. In one aspect, an optimal level of de-ice or anti-ice power is that which eliminates, or prevents, respectively, the formation of ice while minimizing fuel consumption.

Figure 1:
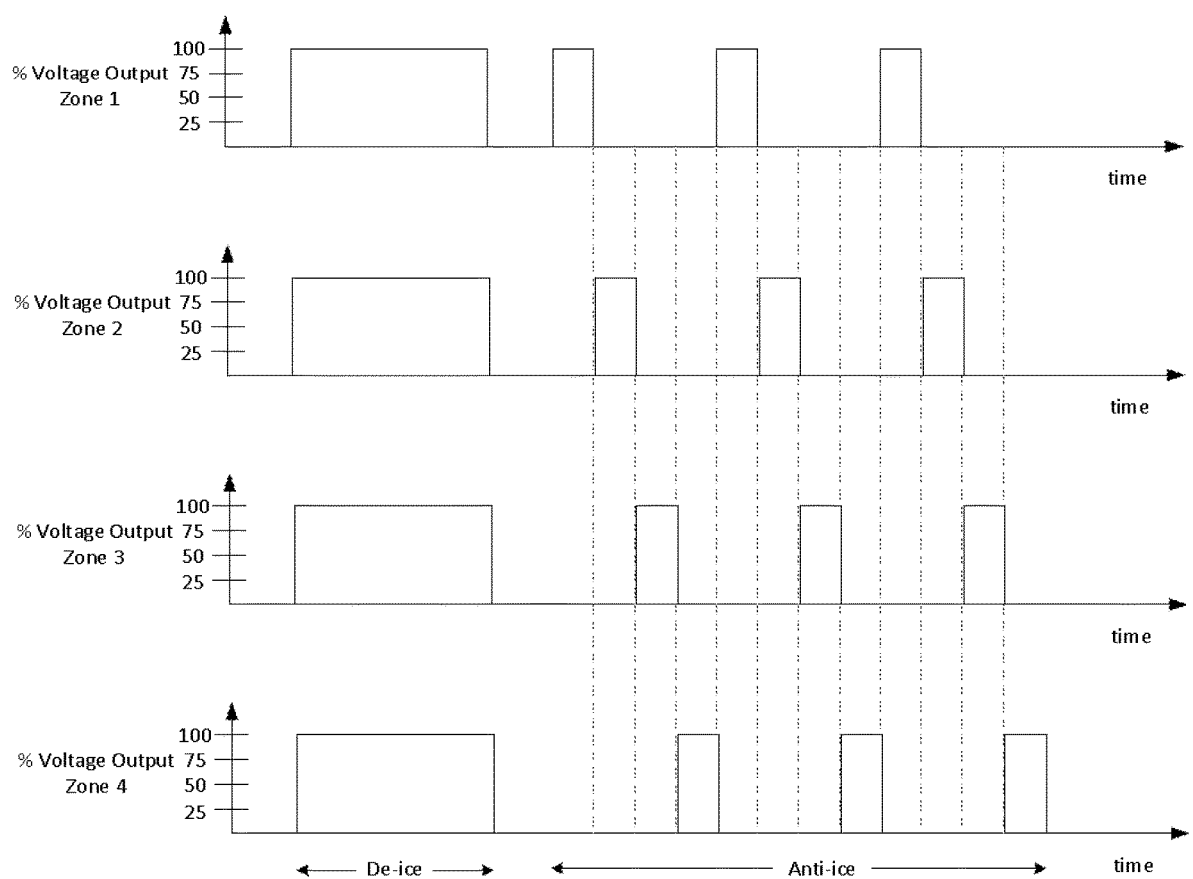
FIG. 1 is a signal diagram of prior art voltage generation for eWIPS in both de-icing and anti-icing operation.

According to one aspect of the present disclosure, and as depicted in FIG. 3, the transitions between voltage levels—whether between the second and first variable voltage levels (that is, between de-ice and anti-ice modes), or between different values of the first variable voltage levels in successive eWIPS monitoring durations in anti-ice mode—are not instantaneous. That is, the transitions between different voltage levels exhibit a not-insignificant slew rate. This aspect reduces or eliminates the torque pulses imparted into the gearbox by the instantaneous, full-power pulse switching characteristic of prior art eWIPS voltage generation systems, as depicted in FIG. 1. Reducing these torque pulses can avoid excessive wear and extend gearbox lifetime.

Figure 4:
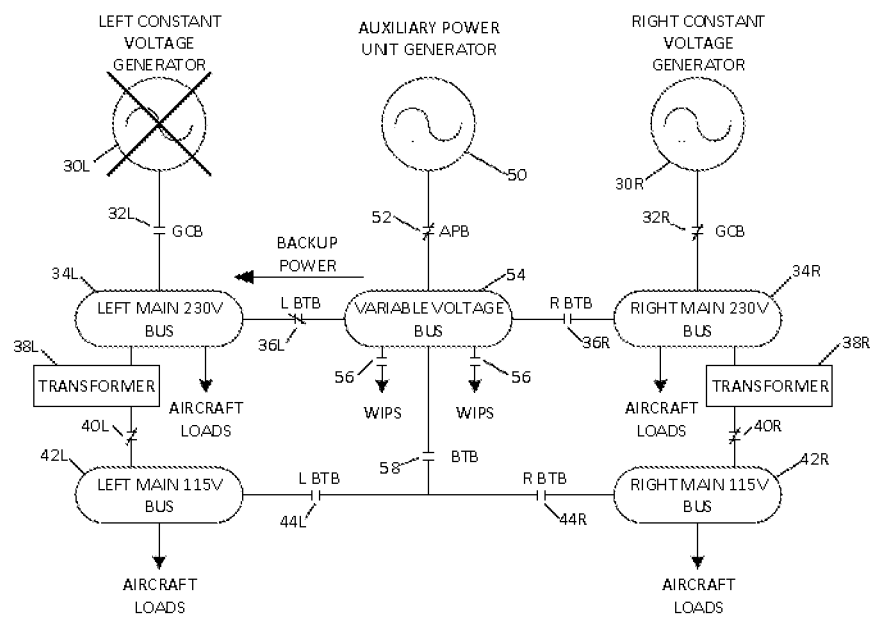
FIG. 4 is a block diagram of an auxiliary generator providing fixed voltage to a main bus as backup power.

FIG. 4 depicts the aircraft power generation and distribution configuration following a failure of the left constant voltage generator 30L. The multi-mode generator (in this case, the auxiliary power unit generator 50) operates in fixed voltage mode, providing backup power, in this case at 230$V_{RMS}$. The auxiliary power unit generator 50 is isolated from the eWIPS loads by circuit breakers 56, and is instead connected to the left main aircraft 230V electrical bus 34L, via the bus tie breaker 36L. In this configuration, the auxiliary power unit generator 50 is isolated from other buses by bus tie breakers (BTB) 36R and 58 being open. The auxiliary power unit generator 50 provides a fixed, 230$V_{RMS}$ voltage to the left main aircraft 230V electrical bus 34L, to power aircraft 230V loads connected thereto. The transformer 38L steps this voltage down to 115$V_{RMS}$, and provides that voltage to the left main aircraft 115V electrical bus 42L, to power aircraft 115V loads. This topology can also be configured during atmospheric conditions not conducive to the formation of ice, wherein the auxiliary power unit generator 50 provides supplemental or backup power to, e.g., the left main aircraft 230V electrical bus 34L.

Those of skill in the art can readily envision other topologies. For example, if the transformer 38L were to fail, the auxiliary power unit generator 50 can operate in fixed voltage mode, outputting 115$V_{RMS}$, and be connected directly to the left main aircraft 115V electrical bus 42L, by opening the bus tie breaker 36L and closing both bus tie breakers 58 and 44L. Failures on the right side can be alleviated similarly.

Figure 5:
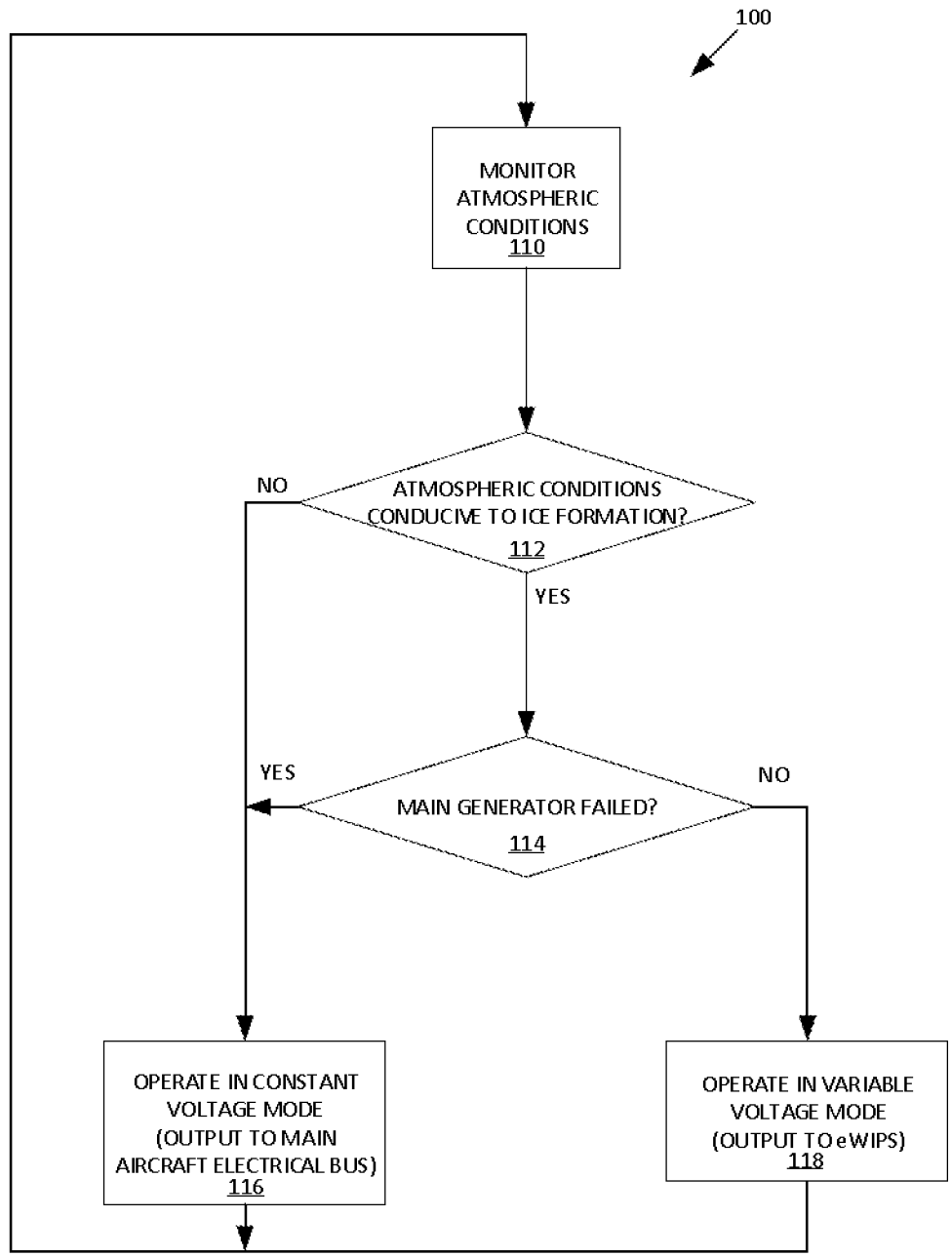
FIG. 5 is a flow diagram of a method of operating a multi-mode generator to power an eWIPS.

FIG. 5 depicts a method 100 of operating a multi-mode generator to power an eWIPS applying heat to flying surfaces of an aircraft. Atmospheric conditions are monitored (block 110). During atmospheric conditions conducive to the formation of ice (block 112) and when sufficient main generators are operative and providing power to a main aircraft electrical bus (block 114), the multi-mode generator is operated in a variable voltage mode and provides a variable voltage to the eWIPS (block 118). Alternatively, during atmospheric conditions not conducive to the formation of ice (block 112), or when atmospheric conditions are conducive to the formation of ice and upon a failure of one or more main generators (block 114), the multi-mode generator is operated in a constant (e.g. fixed) voltage mode and provides a predetermined fixed voltage to the main aircraft electrical bus as backup power (block 116). The method 100 then repeats as atmospheric conditions are continuously or intermittently monitored (e.g., each eWIPS monitoring duration) (block 110).

Figure 6:
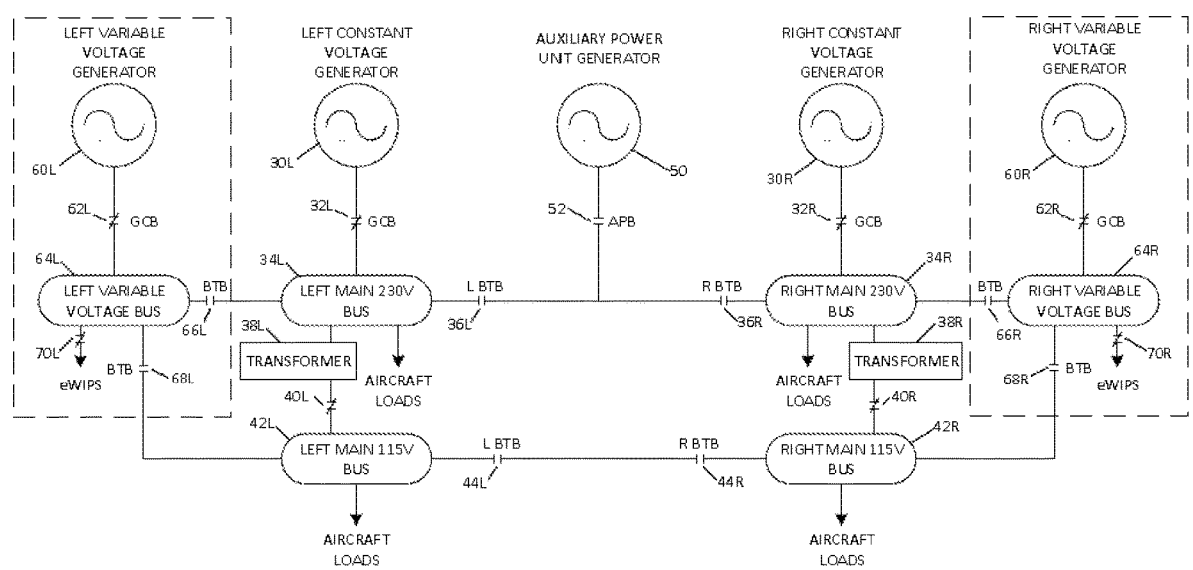
FIG. 6 is a block diagram of dual variable generators providing variable voltage power for eWIPS.

FIG. 6 depicts an aircraft electrical generation and distribution configuration, according to one aspect of the present disclosure. In this aspect, two multi-mode generators—a left variable voltage generator 60L and a right variable voltage generator 60R—power an eWIPS applying heat to flying surfaces of the aircraft. The left and right variable voltage generators 60L, 60R are powered by engines on the left and right wing, respectively. These generators 60L, 60R provide power directly to resistive heating elements of the eWIPS on, e.g., the wing leading edges. The transfer of power from the engines, to an electrical equipment bay in the nose, and back to the eWIPS on the wings, is avoided, saving material and weight. FIG. 6 depicts normal operation in atmospheric conditions conducive to the formation of ice. The components depicted outside of the dashed boxes in FIG. 6 are conventional.

The operation of the constant voltage generators 30L, 30R; generator circuit breakers (GCB) 32L, 32R; main aircraft 230V electrical buses 34L, 34R; left and right bus tie breakers (L BTB, R BTB) 36L, 36R; transformers 38L, 38R; circuit breakers 40L, 40R; main aircraft 115V electrical buses 42L, 42R; and left and right bus tie breakers (L BTB, R BTB) 44L, 44R; are as described above with reference to FIG. 2.

The left variable voltage generator 60L generates power at fixed or variable voltage levels, and provides the power to the left variable voltage bus 64L via the generator circuit breaker (GCB) 62L. When the left variable voltage generator 60L operates in variable voltage mode, the left variable voltage bus 64L provides first and second variable voltages to the eWIPS via circuit breaker 70L. The eWIPS then powers resistive heaters on both wings, as discussed further herein. A first variable voltage level is determined in response to the atmospheric conditions, and can change in successive eWIPS monitoring durations, as depicted in FIG. 3. A second variable voltage level can be predetermined, such as the maximum voltage output of the left variable voltage generator 60L. The left variable voltage bus 64L is isolated from other electrical buses by bus tie breakers 66L and 68L.

The right variable voltage generator 60R operates similarly. When operating in variable voltage mode, the right variable voltage generator 60R provides first and second variable voltages to the right variable voltage bus 64R via generator circuit breaker (GCB) 62R. The right variable voltage bus 64R in turn provides the first and second variable voltages to the eWIPS via circuit breaker 70R. Bus tie breakers (BTB) 66R, 68R isolate the right variable voltage bus 64R from other electrical buses.

Figure 7:
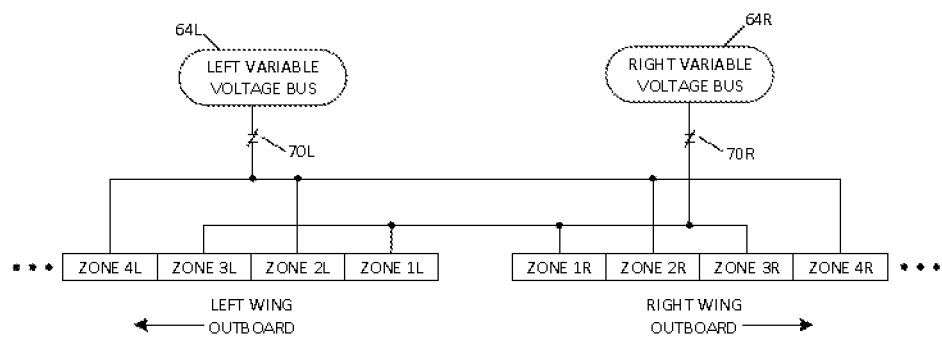
FIG. 7 is a block diagram power distribution in a eWIPS.

FIG. 7 depicts one aspect of distribution of variable voltages from variable voltage buses 64L, 64R to resistive elements on the wings. In this aspect, zones 1L, 1R are inboard zones of the leading edges of wings, and zones 4L, 4R are further outboard zones. As indicated, additional zones can be provided. Additionally, the variable voltage buses 64L, 64R can power eWIPS components installed on other flying surfaces, such as the leading edges of horizontal stabilizers, the inlet cowl of the engines, propellers, rotor blades, or environmental control intakes. In this aspect, the right variable voltage bus 64R powers zones 1 and 3 on both wings, and the left variable voltage bus 64L powers zones 2 and 4 on both wings. In this manner, if either the left or right variable voltage generator 60L, 60R (or some other component) fails, both wings receive some di-ice or anti-ice heating from the remaining variable voltage generator 60L, 60R in a manner that retains symmetric wing performance. Of course, other configurations of the distribution of variable voltage power to eWIPS are possible within the scope of the present disclosure.

Figure 8:
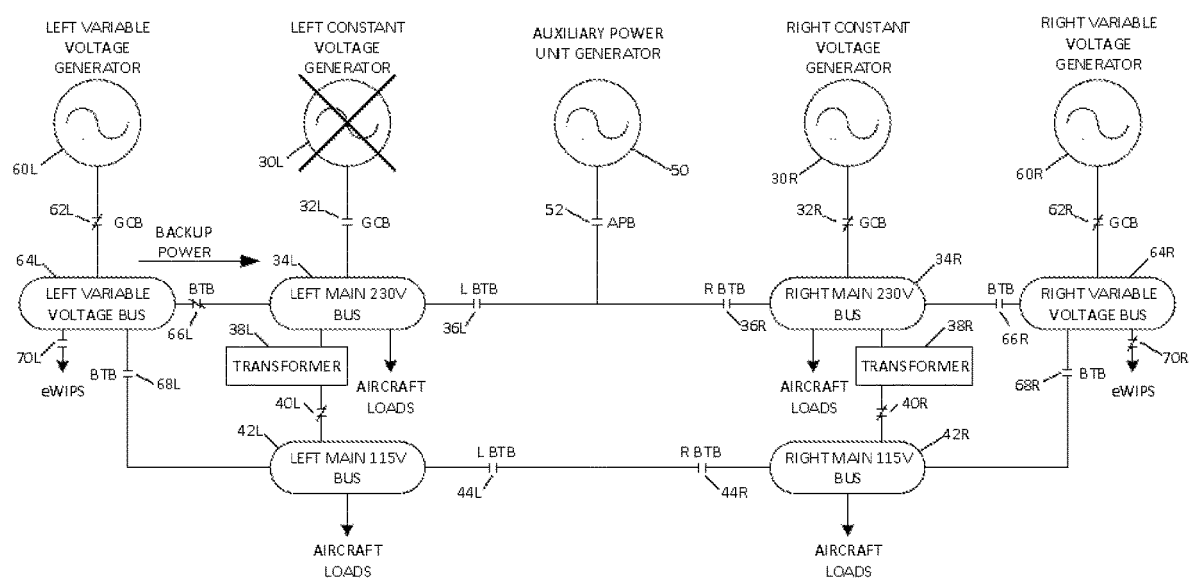
FIG. 8 is a block diagram of dual variable generators with one providing fixed voltage backup power of 230 V.

FIG. 8 depicts the aircraft power generation and distribution configuration following a failure of the left constant voltage generator 30L. One multi-mode generator (in this case, the left variable voltage generator 60L) operates in fixed voltage mode, providing backup power, in this case at $230V_{RMS}$. The left variable voltage bus 64L is isolated from the eWIPS loads by circuit breaker 70L, and is instead connected to the left main aircraft 230V electrical bus 34L, via the bus tie breaker 66L. In this configuration, the left variable voltage bus 64L is isolated from the left main 115V electrical bus 42L by bus tie breaker 68L being open. The left variable voltage generator 60L provides a fixed, $230V_{RMS}$ voltage to the left main aircraft 230V electrical bus 34L, to power aircraft 230V loads connected thereto. The transformer 38L steps this voltage down to $115V_{RMS}$, and provides that voltage to the left main aircraft 115V electrical bus 42L, to power aircraft 115V loads. A failure of the right constant voltage generator 30R can be alleviated by configuring the right variable voltage generator 60R and associated components similarly.

Figure 9:
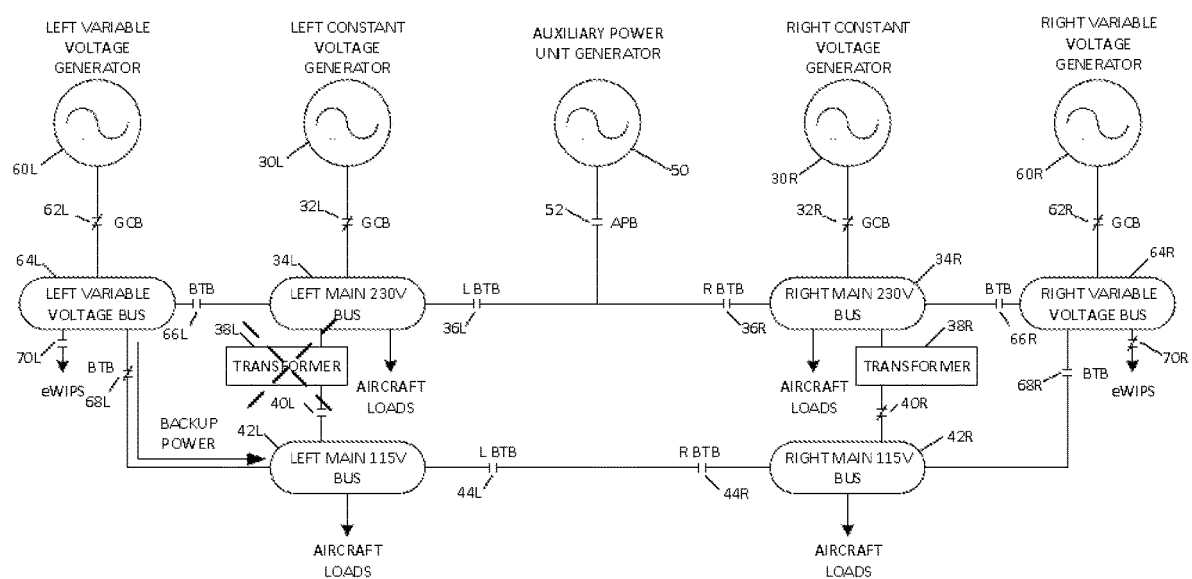
FIG. 9 is a block diagram of dual variable generators with one providing fixed voltage backup power of 115 V.

FIG. 9 depicts the aircraft power generation and distribution configuration following a failure of the left transformer 38L. One multi-mode generator (in this case, the left variable voltage generator 60L) operates in fixed voltage mode, providing backup power, in this case at $115V_{RMS}$. The left variable voltage bus 64L is isolated from the eWIPS loads by circuit breaker 70L, and is instead connected to the left main aircraft 115V electrical bus 42L, via the left bus tie breaker 68L. In this configuration, the left variable voltage bus 64L is isolated from the left main 230V bus 34L by bus tie breaker 66L being open. The left variable voltage generator 60L provides a fixed, $115V_{RMS}$ voltage to the left main aircraft 115V electrical bus 42L, to power aircraft 115V loads connected thereto. The left main aircraft 115V electrical bus 42L is isolated from the faulty transformer 38L, and any possibility of a short to the left main aircraft 230V electrical bus 34L, by the circuit breaker 40L being open. In this case, an additional circuit breaker (not shown) may also isolate the faulty transformer 38L from the left main 230V bus 34L. In general, those of skill in the art will recognize that FIGS. 2, 4, 6, 8, and 9 depict only circuit components directly relevant to discussion of aspects of the present disclosure, and numerous additional components may exist in any given deployment. A failure of the right transformer 38R can be alleviated by configuring the right variable voltage generator 60R and associated components similarly.

Figure 10:
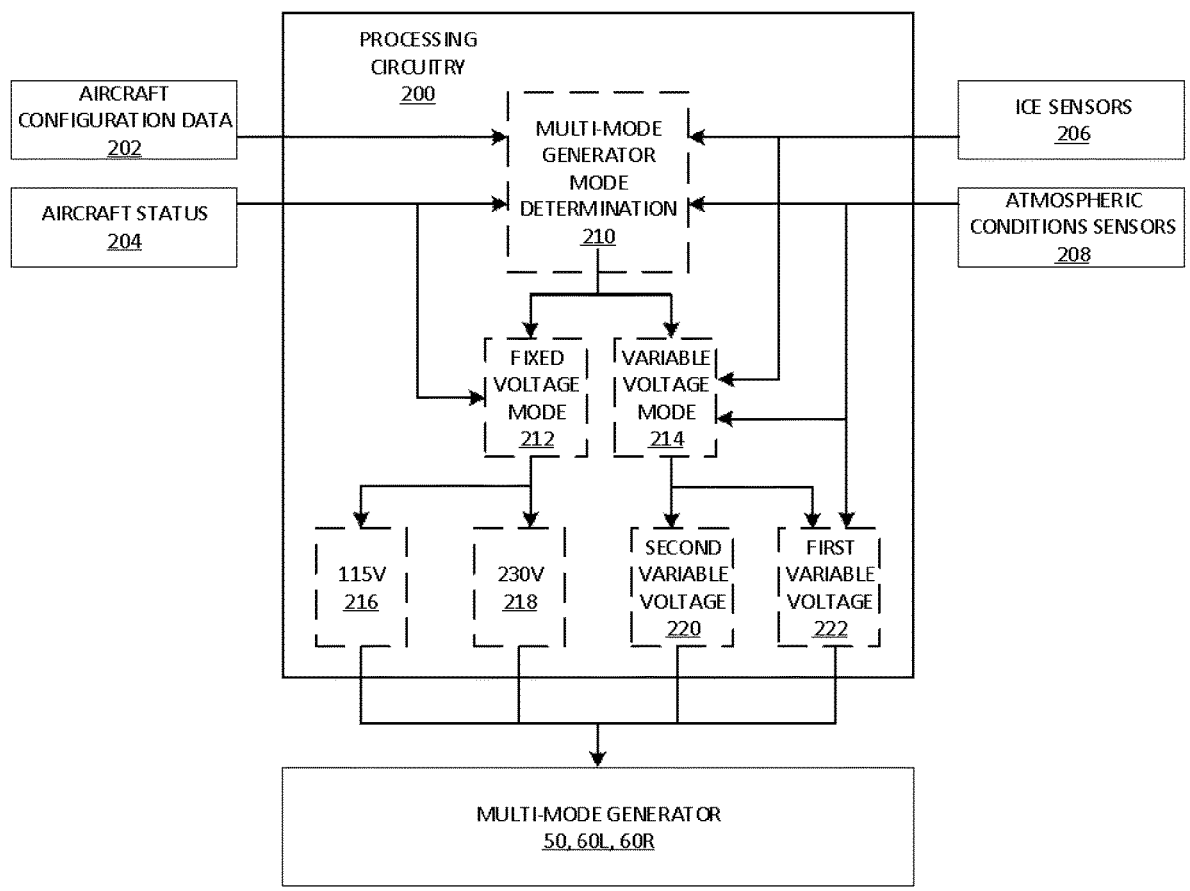
FIG. 10 is a block diagram of processing circuitry for variable voltage generation.

FIG. 10 depicts a functional block diagram of one aspect of logical process flow within processing circuitry 200, according to one aspect of the present disclosure. The processing circuitry 200 can comprise any sequential state machine operative to execute machine instructions stored as machine-readable computer programs in memory, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP); or any combination of the above. Although not depicted in FIG. 10, those of skill in the art understand that the processing circuitry 200 can include, and/or can be operatively connected in data flow relationship with, memory. The memory can comprise any non-transitory machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like.

The blocks depicted in FIG. 10 represent functional decision-making or control flow, and do not necessarily represent an actual division of either software or hardware units. A multi-mode generator mode determination block 210 determines whether one or more multi-mode generators, e.g., 50, 60L, 60R will operate in fixed voltage mode block 212 or variable voltage mode block 214. The fixed voltage mode block 212 then determines the fixed voltage value, e.g., 115V (block 216) or 230V (block 218). The variable voltage mode block 214 determines whether the multi-mode generator will output a second variable voltage (block 220), e.g., full output voltage, or a first variable voltage (block 222), which can change over successive eWIPS monitoring durations in response to atmospheric conditions. The outputs of the relevant one of blocks 216, 218, 220, and 222 control operation of one or more multi-mode generators 50, 60L, 60R.

Input to the multi-mode generator mode determination module 210 includes (but is not limited to) aircraft configuration data 202, aircraft status 204, ice sensors 206, and atmospheric conditions sensors 208.

Aircraft configuration data 202 includes the configuration, type, rating, and the like of various systems and components, such power generation and distribution systems, eWIPS, and the like. In particular, aircraft configuration data 202 can include the number, size, type, location, capacity, and the like of one or more multi-mode generators 50, 60L, 60R; the location, size, rating, control information, and the like of various generator circuit breakers, bus tie breakers, other circuit breakers, and related power distribution components and topology; and the power rating and quantity of eWIPS loads. Aircraft configuration data 202 can be retrieved from memory (not shown), input from flight controls in the cockpit, downloaded via an over-the-air or wired connection to a ground-based control computer, or the like.

Aircraft status 204 includes real-time information related to the operation, condition, temperature, voltages, and the like of aircraft systems and components, including power generation and distribution components. For example, aircraft status 204 includes alerts that one or more constant voltage generators 30L, 30R, transformers 38L, 38R, or other components have failed or otherwise require supplementation, circumvention, or replacement. Aircraft status 204 can additionally include operational information about the aircraft itself, such as altitude, speed, heading, and the like, which information can be useful, in conjunction with atmospheric condition data, in determining whether atmospheric conditions are conducive to the formation of ice.

Ice sensors 206 detect the presence of ice on flying surfaces. Ice sensors 206 indicate a need for de-icing operation of an eWIPS—that is, the generation of a second variable voltage 220, such as full power.

Atmospheric conditions sensors 208 monitor and report outside air conditions, such as temperature, humidity, barometric pressure, rain, freezing rain, and the like. Atmospheric conditions are utilized, along with aircraft status information, to determine whether, and to what extent or severity, atmospheric conditions are conducive to the formation of ice. This determination, in turn, indicates a need for anti-icing operation of an eWIPS, and a required or prudent voltage level of a first variable voltage 222. In one aspect, the variable voltage mode block 214 monitors the atmospheric conditions continuously or periodically, and reassesses the likelihood of ice formation at each expiration of a predetermined eWIPS monitoring interval, as depicted in FIG. 3. In another aspect, the multi-mode generator mode determination 210 and the variable voltage mode 214 may receive information regarding icing, atmospheric conditions, and the like indirectly via communications messages from an eWIPS hosted software application, a dedicated computer, logic card, or other independent system, rather than directly from sensors 206, 208.

In response to aircraft configuration data 202, aircraft status 204, ice sensors 206, and atmospheric conditions sensors 208 (and, in other aspects, possibly additional information), the processing circuitry 200 is operative to control the eWIPS. In particular, the processing circuitry 200 is operative to control one or more multi-mode generators 50, 60L, 60R to, when the processing circuitry 200 determines atmospheric conditions are conducive to the formation of ice and when sufficient main aircraft bus generators are operative, operate in a variable voltage mode 214 and provide a variable voltage to the eWIPS. Further, the processing circuitry 200 is operative to control the one or more multi-mode generators 50, 60L, 60R to, when the processing circuitry 200 determines atmospheric conditions are not conducive to the formation of ice, or upon a failure of one or more main aircraft bus generators 30L, 30R, operate in a fixed voltage mode 212 and provide a predetermined fixed voltage to a main aircraft electrical bus 34L, 34R, 42L, 42R as backup power.

The variable voltage mode block 214, in response to ice sensors 206 and atmospheric condition sensors 208, is operative to provide a first variable voltage 222 to the eWIPS when atmospheric conditions conducive to the formation of ice but no ice is detected, and is further operative to provide a second variable voltage 220, greater than the first variable voltage 222, to the eWIPS when ice is detected. In one aspect, the second variable voltage 220 is a maximum output voltage of a multi-mode generator 50, 60L, 60R. In one aspect, the processing circuitry 200 (i.e., the first variable voltage block 222) dynamically varies the first variable voltage level in response to the atmospheric conditions so as to provide optimum ice protection. In one aspect, optimum ice protection may comprise that level of ice protection sufficient for the removal or prevention of ice formation that minimizes fuel consumption. In one aspect, the first or second variable voltage levels 222, 220 are substantially constant over an eWIPS monitoring duration. Furthermore, transitions between the first and second variable voltage levels 222, 220, or between different values of the first variable voltage levels 220 in successive eWIPS monitoring durations, are not instantaneous, as depicted in FIG. 3.

The fixed voltage mode block 212, in response to aircraft status 204, such as identification of failed or impaired equipment or components, is operative to provide a first predetermined fixed voltage 216, such as $115V_{RMS}$, to a main aircraft 115V electrical bus 42L, 42R as backup power. Similarly, the fixed voltage mode block 218, in response to aircraft status 204, such as identification of failed or impaired equipment or components, is operative to provide a second predetermined fixed voltage 218, such as $230V_{RMS}$, to a main aircraft 230V electrical bus 34L, 34R as backup power.

In one aspect, regardless of whether the first 222 or second 220 variable voltage block generates the control signals, the at least one multi-mode generator 50, 60L, 60R provides power to part of an eWIPS on both of two wings of the aircraft.

In one aspect, the multi-mode generator is an auxiliary power unit generator 50 (FIG. 2), which can comprise a generator 50 driven by a turbine during flight of the aircraft. In one aspect, the aircraft includes two multi-mode generators (FIG. 6), and a first multi-mode generator 60L is driven by an engine on a first wing of the aircraft, and a second multi-mode generator 60R is driven by an engine on a second wing of the aircraft. In this aspect, each of the first 60L and second 60R multi-mode generators provide power to different parts of the eWIPS on both the first and second wings of the aircraft, as depicted in FIG. 7. In this aspect, either or both of the first 60L and second 60R multi-mode generators can independently provide variable power to the eWIPS or fixed power to a main aircraft electrical bus 34L, 34R, 42L, 42R.

Aspects of the present disclosure present numerous advantages over eWIPS power control systems of the prior art. By providing a continuous, variable voltage for anti-icing over a succession of eWIPS monitoring durations, and by enforcing a slew rate on voltage level transition edges, the full-power, instantaneous switching, which is characteristic of prior art eWIPS power control systems, is avoided. This avoids imparting large torque pulses into the engine gearbox, reducing stress and wear. One or more multi-mode generators are available to provide fixed-voltage backup power in the event of a failure of main power generation or distribution equipment or components. In the case of added variable voltage power generators, this backup power capacity supplements prior art systems. In the case that an auxiliary power unit generator is utilized as a multi-mode power generator for powering eWIPS, equipment that was formerly "dead weight" is utilized for flight operations and safety. In either case, the need for routing power from wing to nose and back to wing, and the use of critical controllers in the aircraft electronic equipment bay, is avoided, also obviating the need for extensive, heavy, expensive wiring.

The present disclosure can, of course, be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

What is claimed is:

1. A method of operating a first auxiliary multi-mode generator to power an electric Wing Ice Protection System (eWIPS) applying heat to flying surfaces of an aircraft; comprising:
   monitoring atmospheric conditions;
   during atmospheric conditions conducive to the formation of ice and when sufficient main generators are operative and providing power to a main aircraft electrical bus, operating the first auxiliary multi-mode generator in a variable voltage mode and providing a variable voltage to the eWIPS; and
   during atmospheric conditions not conducive to the formation of ice, or upon a failure of one or more main generators, operating the first auxiliary multi-mode generator in a fixed voltage mode and providing a predetermined fixed voltage to the main aircraft electrical bus as backup power.

2. The method of claim 1 further comprising:
   monitoring the presence of ice on the aircraft flying surfaces; and
   wherein providing a variable voltage to the eWIPS comprises
      providing a first variable voltage to the eWIPS when atmospheric conditions conducive to the formation of ice but no ice is detected; and
      providing a second variable voltage, greater than the first variable voltage, to the eWIPS when ice is detected.

3. The method of claim 2 wherein the second variable voltage is a maximum voltage output of the first auxiliary multi-mode generator.

4. The method of claim 2 wherein the first variable voltage is dynamically varied in response to the atmospheric conditions so as to mitigate the likelihood of ice formation.

5. The method of claim 4 wherein the first or second variable voltages are substantially constant over an eWIPS monitoring duration, and wherein transitions between the first and second variable voltages, or between different values of the first variable voltages in successive eWIPS monitoring durations, are not instantaneous.

6. The method of claim 1 wherein the first auxiliary multi-mode generator provides power to part of a eWIPS on both of two wings of the aircraft.

7. The method of claim 1 wherein the first auxiliary multi-mode generator comprises a generator driven by a turbine during flight of the aircraft.

8. The method of claim 6 further comprising a second auxiliary multi-mode generator, and wherein:
   the first auxiliary multi-mode generator is driven by an engine on a first wing of the aircraft;
   the second auxiliary multi-mode generator is driven by an engine on a second wing of the aircraft; and
   each of the first and second auxiliary multi-mode generators provide power to different parts of the eWIPS on both the first and second wings of the aircraft.

9. The method of claim 8 wherein either or both of the first and second auxiliary multi-mode generators can independently provide variable power to the eWIPS or fixed power to the main aircraft electrical bus.

10. An aircraft comprising two wings, a main aircraft electrical bus, one or more main aircraft bus generators providing fixed voltage to the main aircraft electrical bus, and an electric Wing Ice Protection System (eWIPS) configured to apply heat to flying surfaces of the aircraft, comprising:
    atmospheric condition sensors;
    processing circuitry receiving an output of the atmospheric condition sensors and operative to control the eWIPS; and
    a first auxiliary multi-mode generator configured to
       when the processing circuitry determines atmospheric conditions are conducive to the formation of ice and when sufficient main aircraft bus generators are operative, operate in a variable voltage mode and provide a variable voltage to the eWIPS; and
       when the processing circuitry determines atmospheric conditions are not conducive to the formation of ice, or upon a failure of one or more main aircraft bus generators, operate in a fixed voltage mode and provide a predetermined fixed voltage to the main aircraft electrical bus as backup power.

11. The aircraft of claim 10 further comprising:
    icing sensors communicatively coupled to the processing circuitry and configured to detect the presence of ice on flying surfaces of the aircraft; and
    wherein the first auxiliary multi-mode generator is configured provide a variable voltage to the eWIPS by
       providing a first variable voltage to the eWIPS when the processing circuitry determines that atmospheric conditions are conducive to the formation of ice but no ice is detected; and
       providing a second variable voltage, greater than the first variable voltage, to the eWIPS when the processing circuitry determines that ice is detected.

12. The aircraft of claim 11 wherein the second variable voltage is a maximum voltage output of the first multi-mode generator.

13. The aircraft of claim 11 wherein the processing circuitry dynamically varies the first variable voltage in response to atmospheric conditions so as to mitigate the likelihood of ice formation.

14. The aircraft of claim 11 wherein the first or second variable voltages are substantially constant over an eWIPS monitoring duration, and wherein transitions between the first and second variable voltages, or between different values of the first variable voltages in successive eWIPS monitoring durations, are not instantaneous.

15. The aircraft of claim 10 wherein the first auxiliary multi-mode generator provides power to part of an eWIPS on both of two wings of the aircraft.

16. The aircraft of claim 10 wherein the first auxiliary multi-mode generator comprises a generator driven by a turbine during flight of the aircraft.

17. The aircraft of claim 10 further comprising a second auxiliary multi-mode generator, and wherein:
    the first auxiliary multi-mode generator is driven by an engine on a first wing of the aircraft;
    the second auxiliary multi-mode generator is driven by an engine on a second wing of the aircraft; and
    each of the first and second auxiliary multi-mode generators provide power to different parts of the eWIPS on both the first and second wings of the aircraft.

18. The aircraft of claim 17 wherein either or both of the first and second auxiliary multi-mode generators can independently provide variable power to the eWIPS or fixed power to the main aircraft electrical bus.

19. The method of claim 1 further comprising driving a first one of the main generators with a first engine on a first wing of the aircraft and driving a second one of the main generators with a second engine on a second wing of the aircraft.

20. The aircraft of claim 10 wherein the first auxiliary multi-mode generator is isolated from the eWIPS.

\* \* \* \* \*